US008887956B2

(12) United States Patent
Sekiyama et al.

(10) Patent No.: US 8,887,956 B2
(45) Date of Patent: Nov. 18, 2014

(54) LIQUID SUPPLY DEVICE

(75) Inventors: Takaaki Sekiyama, Kanagawa (JP); Tomohisa Yoshida, Kanagawa (JP); Satoshi Matsuzaka, Kanagawa (JP); Kenji Yokota, Kanagawa (JP)

(73) Assignees: Fuji Xerox Co., Ltd., Tokyo (JP); Fujifilm Corporation, Tokyo (JP)

( * ) Notice: Subject to any disclaimer, the term of this patent is extended or adjusted under 35 U.S.C. 154(b) by 77 days.

(21) Appl. No.: 13/303,560

(22) Filed: Nov. 23, 2011

(65) Prior Publication Data

US 2012/0152977 A1 Jun. 21, 2012

(30) Foreign Application Priority Data

Dec. 20, 2010 (JP) ................................. 2010-283443

(51) Int. Cl.
*B67D 1/00* (2006.01)
*B65D 88/54* (2006.01)
*G01F 11/00* (2006.01)
*B41J 2/175* (2006.01)

(52) U.S. Cl.
CPC ............ *B41J 2/1752* (2013.01); *B41J 2/17523* (2013.01)
USPC .................. 222/81; 222/83; 222/325; 347/86

(58) Field of Classification Search
USPC ................ 222/23, 325, 83.5, 81, 83, 88, 162, 222/541.2, 505; 347/86, 67, 37, 85, 91
See application file for complete search history.

(56) References Cited

U.S. PATENT DOCUMENTS 4,557,727 A * 12/1985 Handt ............................. 604/80
5,500,664 A 3/1996 Suzuki et al.

(Continued)

FOREIGN PATENT DOCUMENTS

EP 0714778 6/1996
EP 714778 A1 * 6/1996 ................. B41J 2/17

(Continued)

OTHER PUBLICATIONS

Partial European Search Report, European Application No. 11192051.8, dated Mar. 6, 2012.

*Primary Examiner* — Paul R Durand
*Assistant Examiner* — Benjamin R Shaw
(74) *Attorney, Agent, or Firm* — Fildes & Outland, P.C.

(57) ABSTRACT

A liquid supply device includes a container, a boring part, an operation lever, a fixing member, and a coupling portion. The container includes a sealing film and is filled with a liquid. The boring part bores the sealing film of the container when the boring part is inserted into the container to discharge the liquid from the container and supply the liquid to a supply destination. The operation lever is connected to the boring part and operates the boring part so that the boring part is pulled out and inserted into the container. The fixing member fixes the operation lever when the boring part is inserted into the container. The coupling portion is installed in the container and is coupled with the operation lever when the operation lever is moved to the position where the boring part is inserted into the container to prevent the boring part from slipping.

5 Claims, 18 Drawing Sheets

(56) References Cited

U.S. PATENT DOCUMENTS

| | | | | |
|---|---|---|---|---|
| 5,971,534 | A * | 10/1999 | Sasaki et al. | 347/86 |
| 6,328,415 | B1 * | 12/2001 | Norton et al. | 347/37 |
| 6,779,880 | B1 * | 8/2004 | Kulpa et al. | 347/86 |
| 7,178,909 | B2 * | 2/2007 | Yoshiyama et al. | 347/86 |
| 7,384,124 | B2 * | 6/2008 | Yang | 347/37 |
| 7,469,990 | B2 * | 12/2008 | Silverbrook et al. | 347/42 |
| 7,543,920 | B2 * | 6/2009 | Wilson et al. | 347/84 |
| 7,552,989 | B2 * | 6/2009 | Katada | 347/19 |
| 2004/0119799 | A1 | 6/2004 | Kulpa et al. | |
| 2009/0251512 | A1 * | 10/2009 | Nozawa et al. | 347/86 |

FOREIGN PATENT DOCUMENTS

| | | | | |
|---|---|---|---|---|
| EP | 0791463 | | 8/1997 | |
| EP | 0854046 | | 7/1998 | |
| EP | 1114726 | | 7/2001 | |
| EP | 1114726 | A1 * | 7/2001 | B41J 2/175 |
| EP | 1219440 | | 7/2002 | |
| EP | 1609604 | | 12/2005 | |
| JP | 2004-230796 | | 8/2004 | |
| JP | 2010-000668 | | 1/2010 | |
| WO | 2008/104110 | | 9/2008 | |
| WO | 2010/044788 | | 4/2010 | |

* cited by examiner

LIQUID SUPPLY DEVICE

CROSS-REFERENCE TO RELATED APPLICATIONS

This application is based upon and claims priority under 35 USC 119 from Japanese Patent Application Nos. 2010-283443, filed Dec. 20, 2010.

BACKGROUND

Technical Field

The present invention relates to a liquid supply device.

SUMMARY OF THE INVENTION

According to an aspect of the invention, a liquid supply device includes a container, a boring part, an operation lever, a fixing member, and a coupling portion. The container includes a sealing film and is filled with a liquid. The boring part bores the sealing film of the container when the boring part is inserted into the container to discharge the liquid from the container and supply the liquid to a supply destination. The operation lever is connected to the boring part and operates the boring part so that the boring part is pulled out and inserted into the container. The fixing member fixes the operation lever when the boring part is inserted into the container. The coupling portion is installed in the container and is coupled with the operation lever when the operation lever is moved to the position where the boring part is inserted into the container to prevent the boring part from slipping from the container.

BRIEF DESCRIPTION OF THE DRAWINGS

Exemplary embodiments of the invention will be described in detail based on the following figures, wherein.

DETAILED DESCRIPTION

Next, an embodiment of the liquid supply device of the present invention will be explained with reference to the drawings.

(Overall Constitution)

Figure 1:
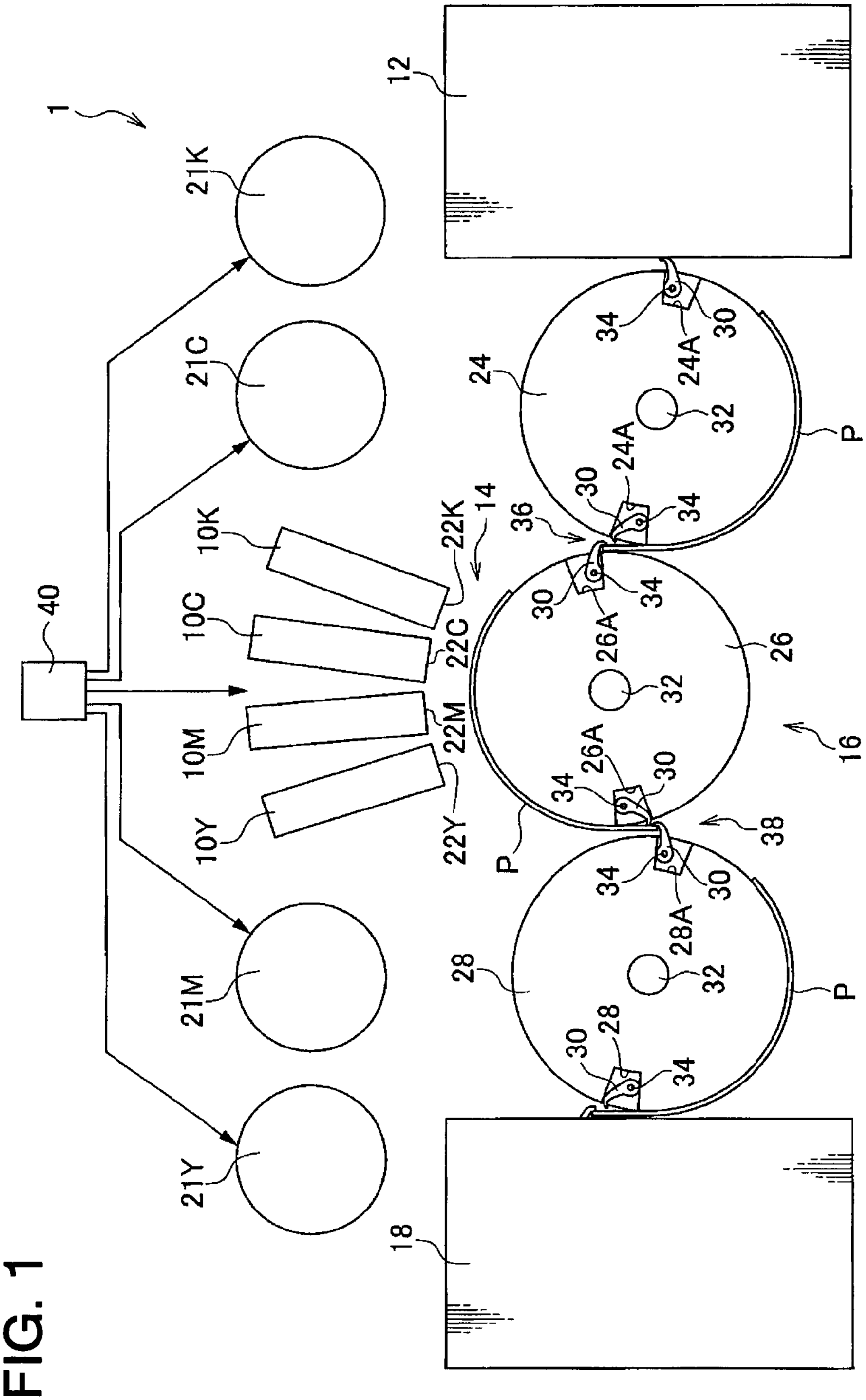
FIG. 1 is an outlined diagram showing the entire constitution of an ink-jet recording device 1 including a liquid supply device 40 of the present invention.

FIG. 1 is an outlined diagram showing the entire constitution of an ink-jet recording device including the liquid supply device of the present invention.

As shown in FIG. 1, an ink-jet recording device 1 is equipped with a recording-medium housing part 12 for housing a recording medium P such as papers, an image recording part 14 for recording an image on the recording medium P, a conveyance unit 16 for conveying the recording medium P to the image recording part 14 from the recording-medium housing part 12, and a recording-medium discharge part 18 for discharging the recording medium P on which the image has been recorded by the image recording part 14.

The image recording part 14 is provided with liquid-drop jet units (hereinafter, referred to "ink-jet heads") 10Y, 10M, 10C, and 10K for recording an image on the recording medium by jetting ink drops as an example of liquid-drop jet heads for jetting liquid drops. Here, the ink-jet heads 10Y, 10M, 10C, and 10K are sometimes generally called "ink-jet heads 10Y-10K."

In addition, the ink-jet heads 10Y-10K respectively have nozzle surfaces 22Y-22K on which nozzles (not shown in the figure) are formed. These nozzle surfaces 22Y-22K have a recordable area that is about the same as or greater than the maximum width of the recording medium P on which image recording in the ink-jet recording device 1 is assumed to take place.

Moreover, the ink-jet heads 10Y-10K are arranged in parallel in the order of yellow (Y), magenta (M), cyan C, and black (K) colors from the downstream side in the conveying direction of the recording medium P, with ink drops corresponding to these respective colors being jetted in a piezoelectric mode from several nozzles to record images. Here, the constitution in which ink drops are jetted from the ink-jet heads 10Y-10K may also be a constitution in which ink jets are jetted in other modes such as the thermal mode.

In the ink-jet recording device 1, main ink tanks 21Y, 21M, 21C, and 21K (hereinafter, shown by 21Y-21K) for storing ink with each color are installed as parts for storing liquids. Ink is supplied to each ink-jet head 10Y-10K from these main ink tanks 21Y-21K. Here, as the ink that is supplied to each ink-jet heads 10Y-10K, various kinds of inks such as an aqueous ink, oily ink, and solvent system ink are usable.

The conveyance unit 16 has a drawing drum 24 for drawing out the recording medium P in the recording-medium housing part 12 one sheet by one sheet, a conveying drum 26 as a conveyer that conveys the recording medium P to the ink-jet heads 10Y-10K of the image recording part 14 and that causes the recording face (surface) to face the ink-jet heads 10Y-10K, and a feeding drum 28 for feeding the recording medium P, on which an image has been recorded, to the recording-medium discharge part 18. In addition, the drawing drum 24, conveying drum 26, and feeding drum 28 are respectively constituted so that the recording medium P is held on its peripheral surface by an electrostatic adsorption portion or a non-electrostatic adsorption portion such as absorption or adhesion.

Moreover, the drawing drum 24, conveying drum 26, and feeding drum 28, for example, are respectively provided with two respective sets of grippers 30 as holding units for sandwiching and holding the downstream side ends in the conveying direction of the recording medium P. These three drums 24, 26, and 28 can hold the recording medium P up to two sheets in this case by the grippers 30 on each peripheral surface. Furthermore, the grippers 30 are installed in two respective concave parts 24A, 26A, and 28A formed on the peripheral surfaces of each drum 24, 26, and 28.

Specifically, rotational shafts 34 are supported along rotational shafts 32 of each drum 24, 26, and 28 with respect to preset positions in the concave parts 24A, 26A, and 28A of each drum 24, 26, and 28. Several grippers 30 are fixed at an interval in the axial direction with respect to the rotational shafts 34. Therefore, with the rotation of the rotational shafts 34 in both the forward and backward directions by an actuator not shown in the figure, the grippers 30 are rotated in both the forward and backward directions along the peripheral direction of each drum 24, 26, and 28. They sandwich and hold or separate the downstream side ends in the conveying direction of the recording medium P.

In other words, the grippers 30 rotate so that their tips slightly protrude from the peripheral surfaces of each drum 24, 26, and 28, delivering the recording medium P to the gripper 30 of the conveying drum 26 from the gripper 30 of the drawing drum 24 at a delivery position 36, where the peripheral surface of the drawing drum 24 and the peripheral surface of the conveying drum 26 face each other, delivering the recording medium P to the gripper 30 of the feeding drum 28 from the gripper 30 of the conveying drum 26 at a delivery position 38, where the peripheral surface of the conveying drum 26 and the peripheral surface of the feeding drum 28 face each other.

In addition, the ink-jet recording device 1 is provided with a maintenance unit (not shown in the figure) for maintaining the ink-jet heads 10Y-10K. The maintenance unit has a cap for covering the nozzle surfaces of the ink-jet heads 10Y-10K, a receiving part for receiving liquid drops that are pre-jetted (empty jet), a cleaning part for cleaning the nozzle surfaces, a suction unit for absorbing ink in the nozzles, etc., with the maintenance unit moving to the position opposite to the ink-jet heads 10Y-10K and to perform various kinds of maintenance. Moreover, a cleaning solution, which will be mentioned later, is supplied to the maintenance unit.

Next, the image recording operation of the ink-jet recording device 1 will be explained.

The recording medium P drawn by the gripper 30 of the drawing drum 24 by one sheet out of the recording-medium housing part 12 are held and conveyed while being adsorbed to the peripheral surface of the drawing drum 24, then delivered to the gripper 30 of the conveying drum 26 from the gripper 30 of the drawing drum 24 at the delivery position 36.

The recording medium P held by the gripper 30 of the conveying drum 26 is conveyed up to an image-recording position of the ink-jet heads 10Y-10K while being adsorbed onto the conveying drum 26, and an image is recorded on the recording surface by ink drops that are jetted from the ink-jet heads 10Y-10K.

The recording medium P, on which the image has been recorded on the recording surface, is delivered to the gripper 30 of the feeding drum 28 from the gripper 30 of the conveying drum 26 at the delivery position 38. Next, the recording medium P held by the gripper 30 of the feeding drum 28 is conveyed while being adsorbed to the feeding drum 28 and is discharged to the recording medium discharge part 18. In this manner, a series of image recording operations is carried out.

The liquid supply device 40 of the present invention is connected to the main ink tanks 21Y-21K. The liquid supply device 40 supplies ink or a cleaning solution to a liquid storage tank for supplying the cleaning solution to the main ink tanks 21Y-21K and the maintenance unit.

(Liquid Supply Device)

Figure 2:
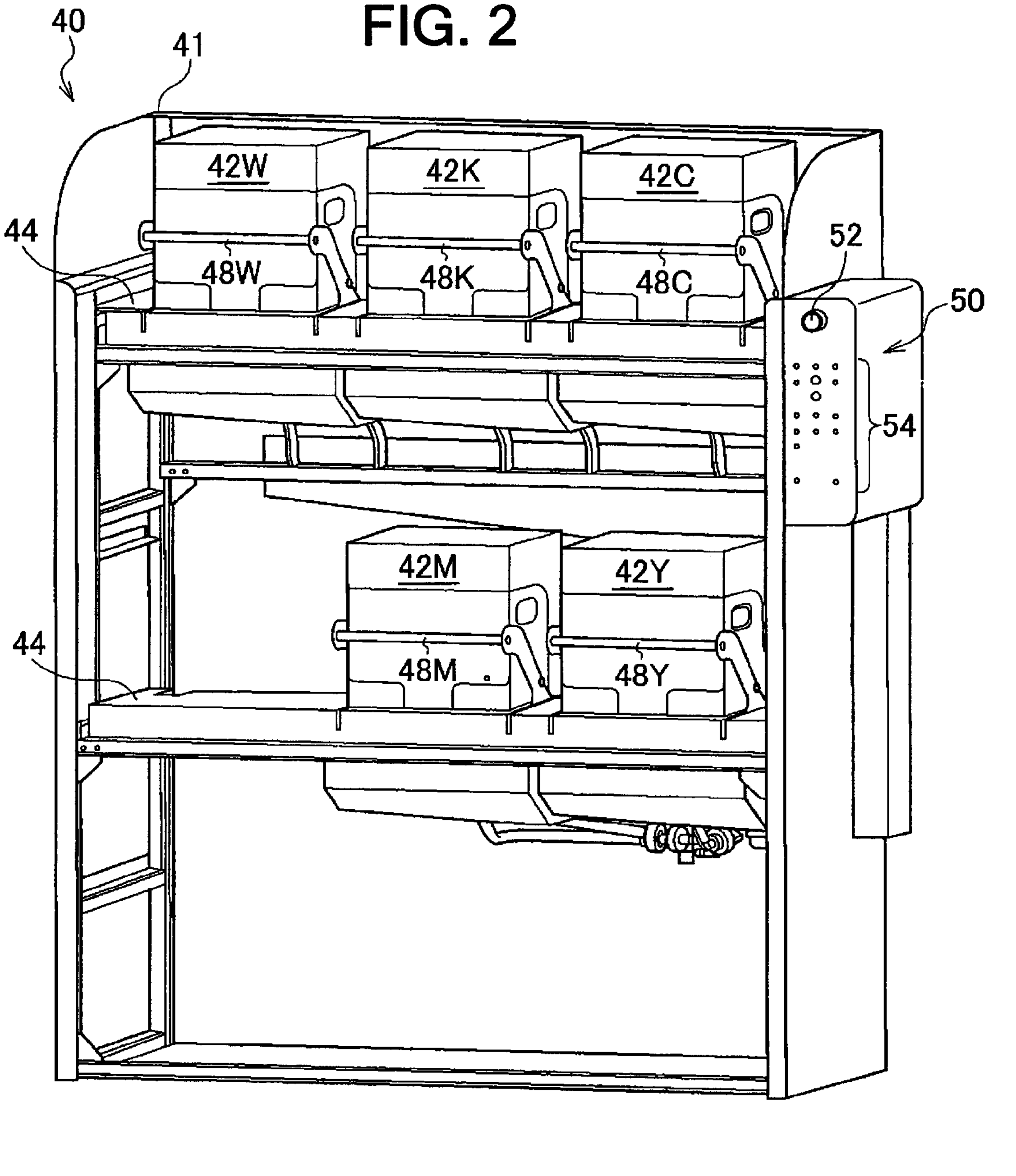
FIG. 2 is an entire oblique view showing the liquid supply device 40.

FIG. 2 is an entire oblique view showing the liquid supply device 40.

The liquid supply device 40 includes a three-step shelf-shaped case 41 and five tank units 42Y, 42M, 42C, 42K, and 42W that are provided to the case 41. Here, the tank units 42Y, 42M, 42C, 42K, and 42W are sometimes generally called "tank units 42Y-42W." The tank units 42Y-42W respectively exhibit approximate cubes.

The tank units 42Y, 42M, 42C, and 42K are respectively filled with yellow, magenta, cyan, and black inks, with the tank unit 42W being filled with a cleaning solution. The tank units 42Y-42W are freely attached and detached to and from the pedestal 44 of the case 41 and are exchange-type supply tanks for supplying a liquid to a supply destination.

The tank unit 42Y and the tank unit 42M are installed on the pedestal 44 at an intermediate step of the case 41. Via each corresponding pipe 46 (not shown in FIG. 1; see FIGS. 11 and 12 which will be mentioned later), the tank unit 42C, tank unit 42K, and tank unit 42W are installed on the pedestal 44 at an upper step of the case 41. The tank unit 42Y is connected to the main ink tank 21Y, the tank unit 42M is connected to the main ink tank 21M, the tank unit 42C is connected to the main ink tank 21C, the tank unit 42K is connected to the main ink tank 21K, and the tank unit 42W is connected to the maintenance unit.

Each tank unit 42Y-42W is installed above the main ink tanks 21Y-21K and the maintenance unit which is connection destinations (supply destinations) of the tank unit 42Y-42W. The ink or the cleaning solution is supplied to the destinations by water head difference.

In the case 41, operation levers 48Y, 48M, 48C, 48K, and 48W are installed in accordance with each tank unit 42Y-42W. The operation levers 48Y, 48M, 48C, 48K, and 48W, as will be mentioned, are operated in the vertical direction by the operator when the tank units 42Y-42W are exchanged.

A control panel 50 is mounted in the vicinity of the right upper part of the case 41. The control panel 50 is provided with an operation switch 52 and several display lamps 54. When the amount of ink of any of the main ink tanks 21Y-21K or the amount of cleaning solution of the maintenance unit is decreased to a preset amount, the corresponding display lamp 54 is lit and the operator is prompted to exchange the tank units 42Y-42W.

Next, since the constitution of each tank unit 42Y-42W and the mounting state on the pedestal 44 are the same, one tank unit 42Y will be explained in detail. Here, the attached letter "Y" is also appropriately omitted.

Figure 3:
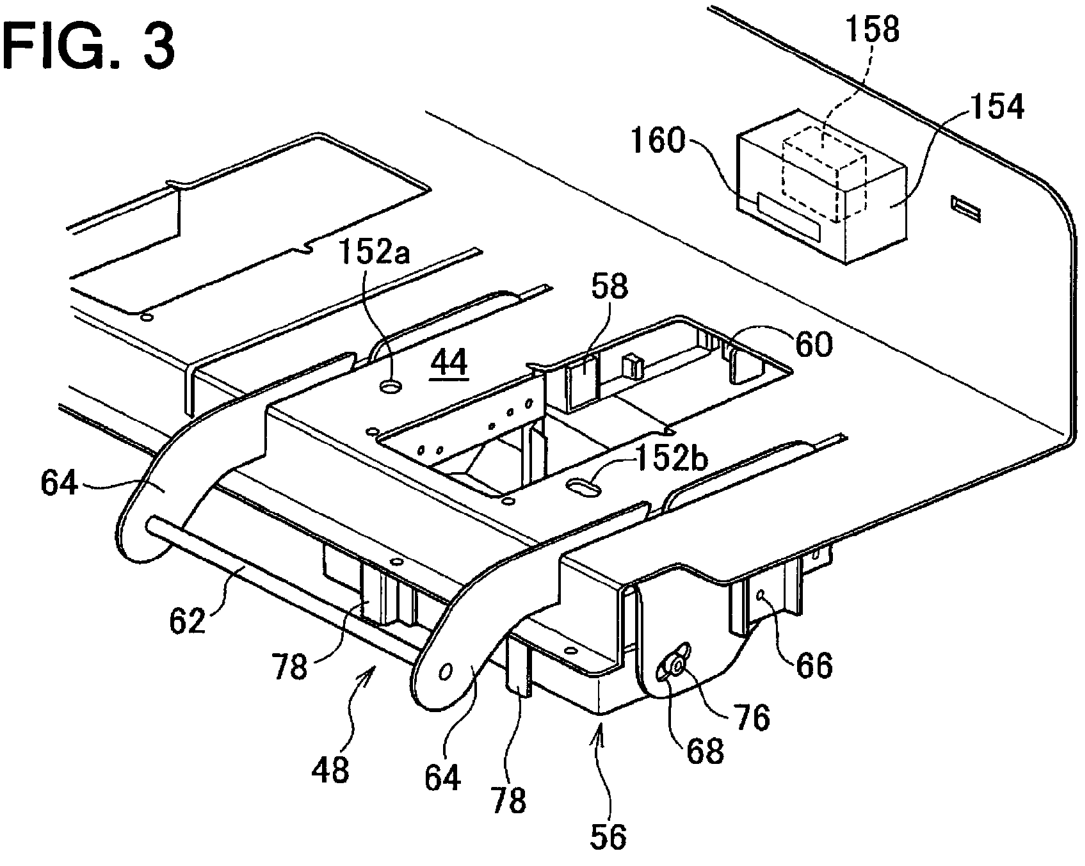
FIG. 3 is an oblique view showing the vicinity of a pedestal 44 on which a tank unit 42 is installed.
Figure 4A:
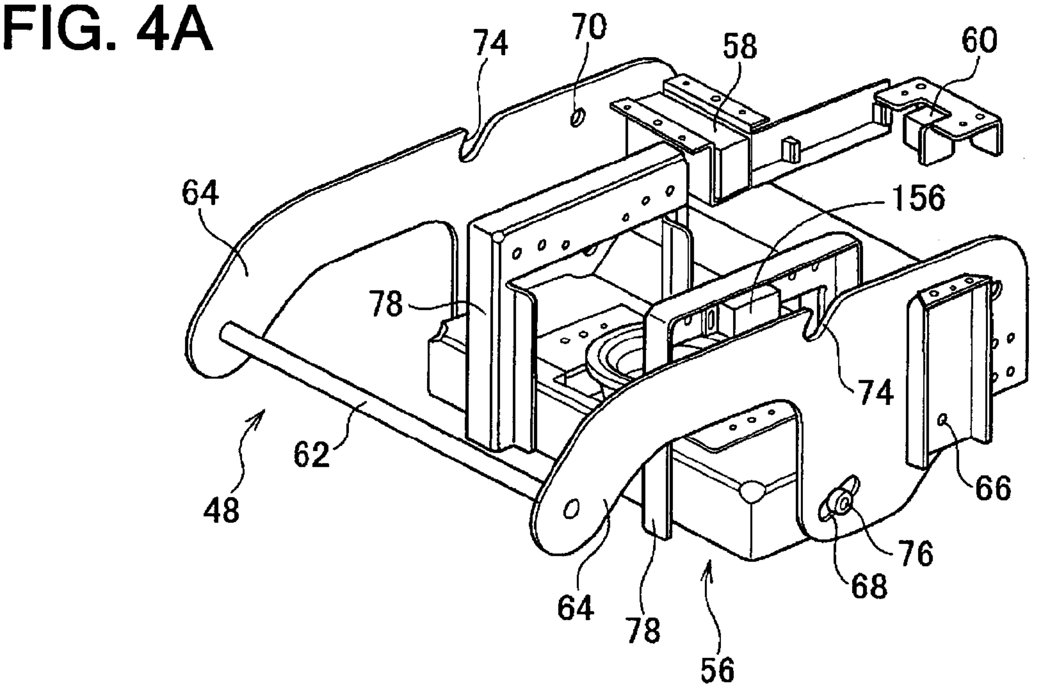
FIGS. 4A and 4B are oblique views showing the inside of the pedestal 44 in a state in which the pedestal cover is removed from FIG. 3.
Figure 4B:
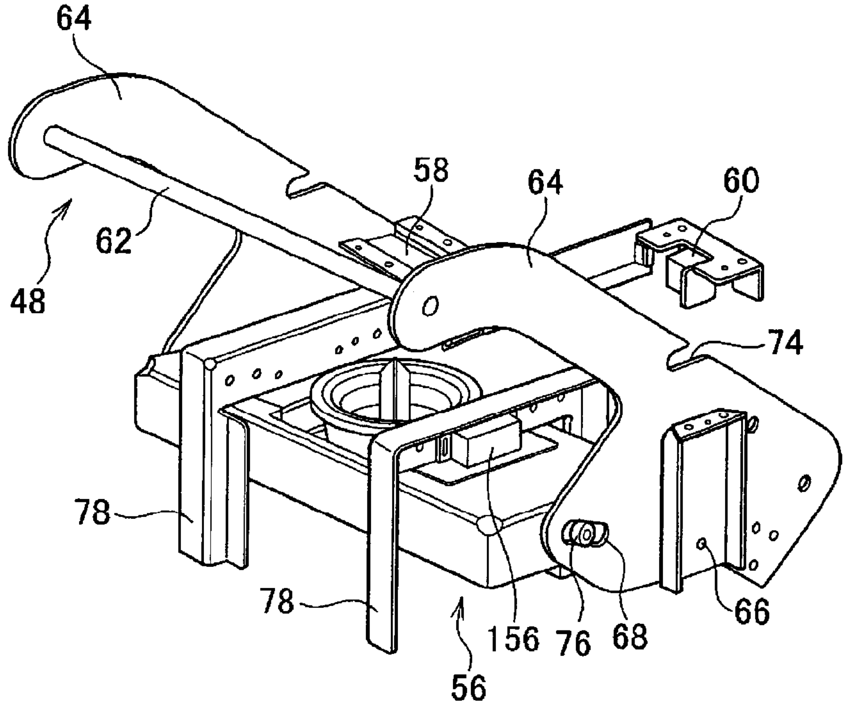
Figure 5A:
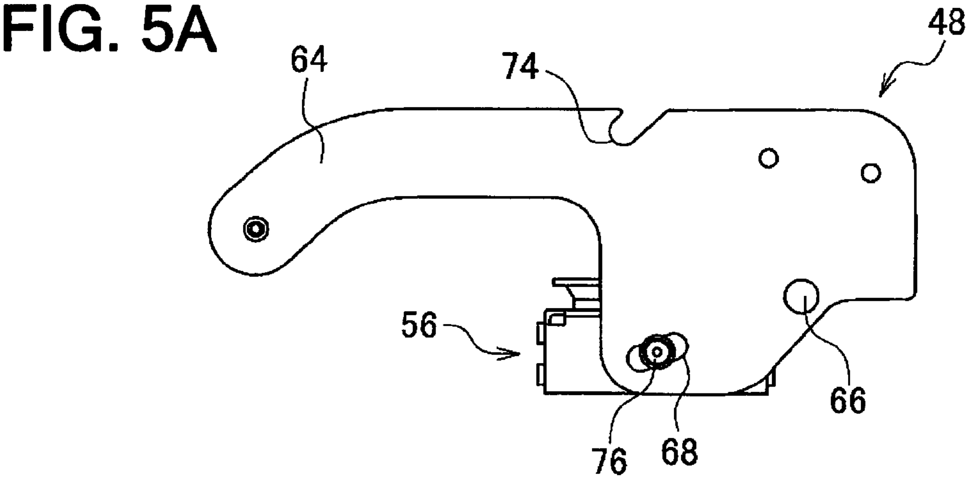
FIGS. 5A and 5B are side views showing the inside of the pedestal 44 shown in FIG. 4, mainly an operation lever 48.
Figure 5B:
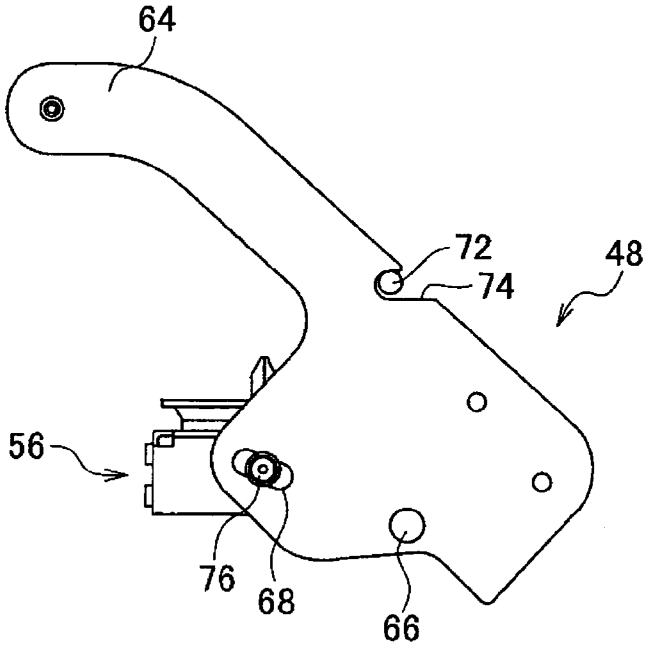

FIG. 3 is an oblique view showing the vicinity of the pedestal 44 on which the tank unit 42 is installed. FIGS. 4A and 4B are oblique views showing the inside of the pedestal 44 in a state in which the pedestal cover is removed from FIG. 3. Here, FIG. 4A shows a state in which the operation lever 48 is positioned at the lower side. FIG. 4B shows the operation lever 48 positioned at the upper side. FIGS. 5A and 5B are side views showing the inside of the pedestal 44 shown in FIGS. 4A and 4B, mainly the operation lever 48. Here, FIG.

5A shows a state in which the operation lever 48 is positioned at the lower side. FIG. 5B shows the operation lever 48 positioned at the upper side.

On the pedestal 44, the operation lever 48, boring part 56, lock solenoid 58, and tank detection sensor 60 are installed.

The operation lever 48 includes a grip part 62 and two lever arms 64. The grip part 62 is arranged along the longitudinal direction of the case 41. The lever arms 64 are connected to both ends in the longitudinal direction of the grip part 62. Each lever arm 64 is supported with respect to the pedestal 44 via a rotational shaft 66, with the operation lever 48 being freely rotated on the rotational shaft 66. In the lever arm 64, a long hole 68, round hole 70, and notched groove 74 for coupling with coupling pins 72, which will mentioned later, are formed. The notched groove 74 is formed along the circumference centering around the rotational shaft 66.

The boring part 56 is arranged at the position opposite to the tank unit 42 in the pedestal 44. The boring part 56 is connected to the operation lever 48 and is vertically operated in accordance with the operation position of the operation lever 48. Specifically, the boring part 56 is arranged between the lever arms 64. Side end pins 76, which are installed at both ends of the boring part 56, are inserted into the long holes 68 formed in the lever arms 64 and are connected to the operation lever 48. The boring part 56 is vertically moved along two guide parts 78 installed on the side surfaces of the boring part 56 in accordance with the rotating operation of the operation lever 48.

As will be mentioned later, if the boring part 56 is operated upward by the operation leer 48, it is inserted (put) into the tank unit 42, with the tank unit 42 being unsealed by the boring part 56, discharging the liquid (ink) from the tank unit 42.

The lock solenoid 58 is installed in the vicinity of the lever arm 64 in the pedestal 44, with the operation lever 48 being locked (fixed) so that it is not rotated. Specifically, a movable rod (not shown in the figure) of the lock solenoid 58 is inserted into the rough hole 70, which is installed in the lever arm 64, to lock the rotating operation of the operation lever 48. Here, as the round holes 70 that are installed in the lever arms 64, there are two round holes which includes the round hole 70 for locking the operation lever 48 operated upward at the position and the round hole 70 for locking the operation lever 48 operated downward at the position.

The tank detection sensor 60 is installed at the position opposite to the tank unit 42 in the pedestal 44, whether or not the tank unit 42 is placed on the pedestal 44 is detected, and an output signal is transmitted based on the detection result. In addition, a reader for reading intrinsic data of the tank unit 42 is arranged inside the pedestal 44. In case the tank unit 42 is placed on the pedestal 44, the intrinsic data of the tank unit 42 are read out by this reader. For example, a bar code is installed in the tank unit 42, with the intrinsic data being read out through a window 160 by a bar code reader 158 shown in FIG. 3 and installed in a stopper 154, which will be mentioned later.

Figure 6A:
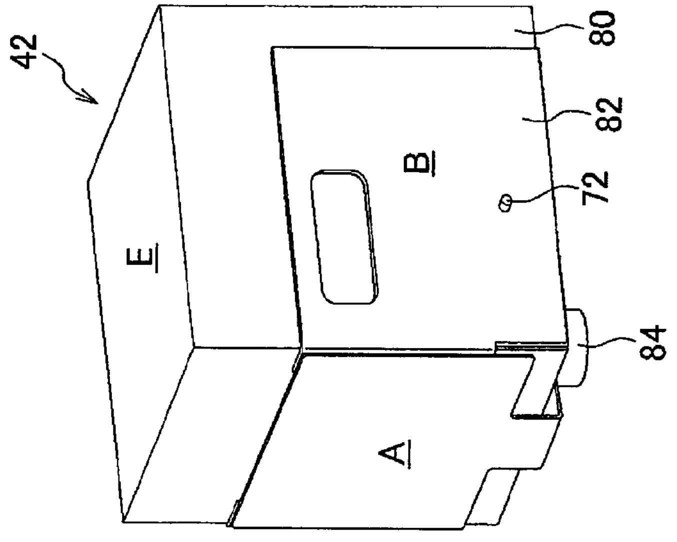
FIGS. 6A to 6C are oblique views showing the tank unit 42.
Figure 6B:
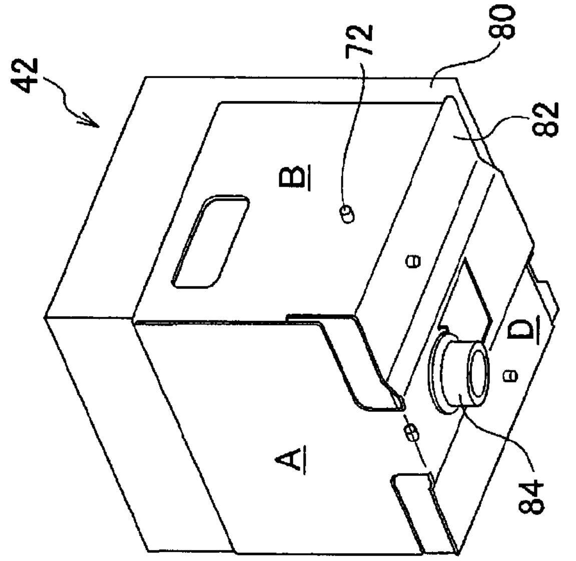
Figure 6C:
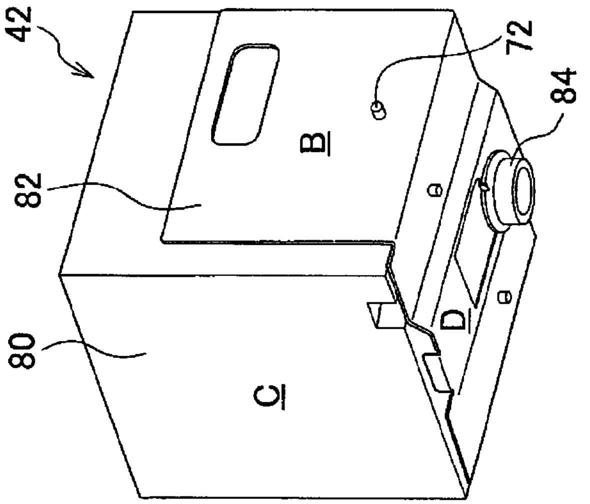

FIGS. 6A to 6C are oblique views showing the tank unit 42. In FIGS. 6A to 6C, the tank unit 42 observed from three directions while changing the angle is shown.

The tank unit 42 includes a carton unit 80 and a carton adapter 82. The face shown by A in the figure is a face (front) toward the front, the face shown by B is a back face, the face shown by C is a back face, the face shown by D is a bottom face, and the face shown by E is a top face. From the bottom face D, an opening part 84, as the inlet and outlet of a liquid, protrudes.

Figure 7:
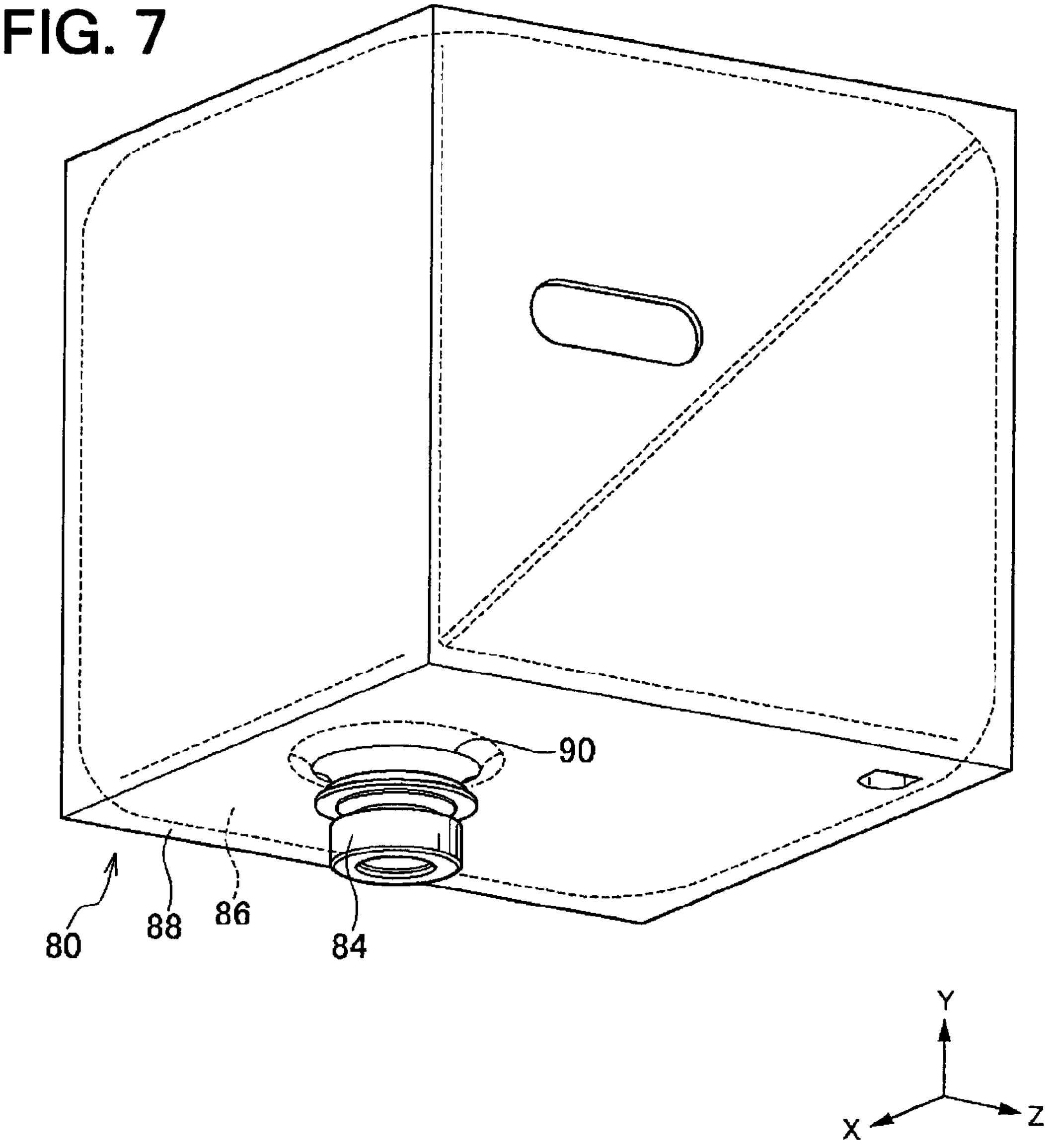
FIG. 7 is an oblique view showing a carton unit 80.

FIG. 7 is an oblique view showing the carton unit 80.

The carton unit 80 exhibits an approximately cubic shape. The carton unit 80 includes a liquid pack (liquid bag) 86 filled with a liquid (ink) and a carton (paper box) 88 for housing the liquid pack 86. The liquid pack 86 is provided with the opening part 84 as an inlet and outlet of the liquid, with an aperture 90 for exposing the opening part being installed in the carton 88.

Figure 8:
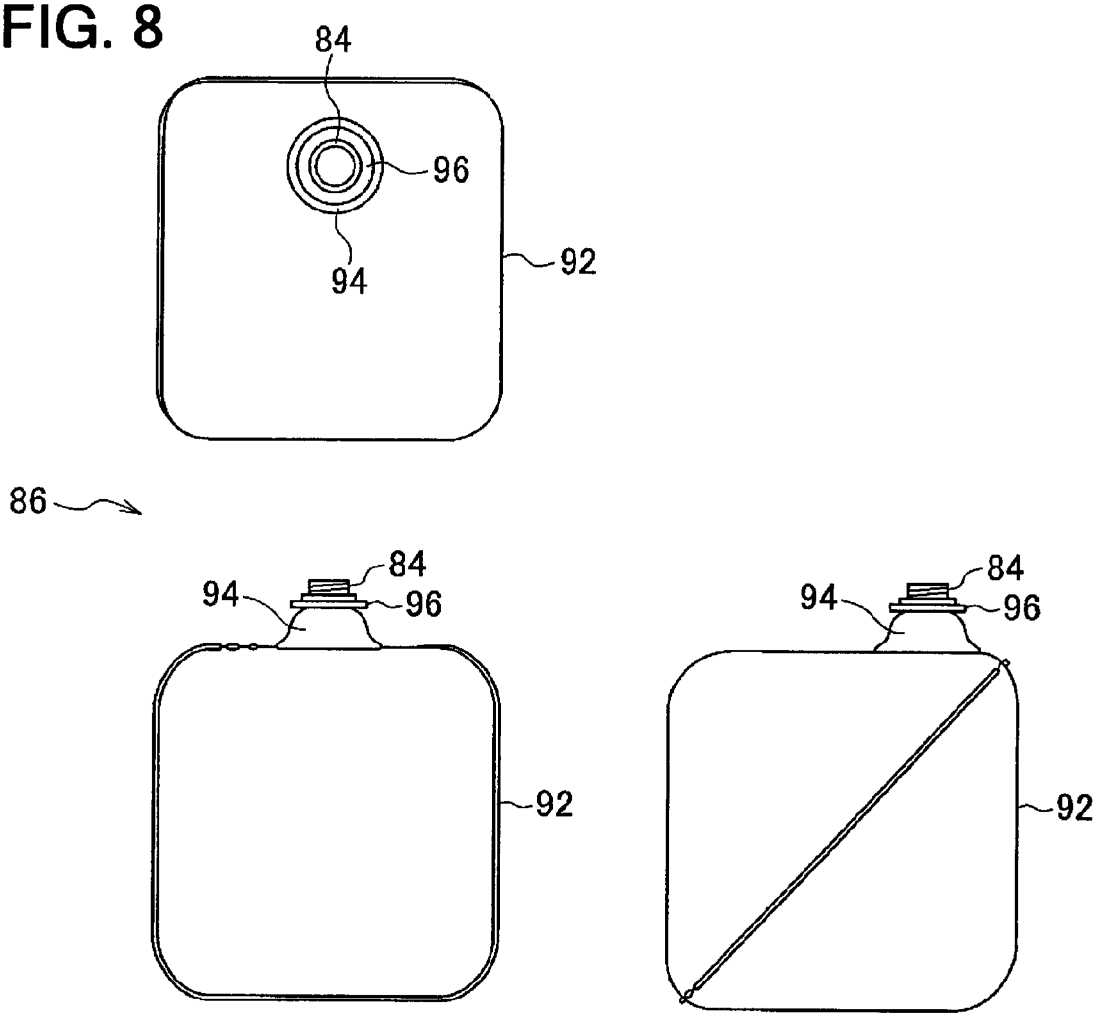
FIG. 8 is a three-face diagram showing a liquid pack 86.

FIG. 8 is a three-face diagram showing the liquid pack 86.

The liquid pack 86, for example, includes a liquid housing part 92 exhibiting an approximately cubic shape and made of polyethylene and has an opening part 84 acting as an inlet and outlet of a liquid to the liquid housing part 92. The opening part 84 is made of a resin material and exhibits an approximately cylindrical shape. Part of the liquid housing part 90[sic; 92] is provided with a funnel-shaped part 94 formed in a funnel shape so that it is extended to the opening part. In the opening part 84, a collar part 96, which is stretched out of the outer periphery of the opening part, is formed at the connection position with the funnel-shaped part 94. The opening part 84 and the funnel-shaped part 94 are installed at a position offset to one side (front side) from the center on one face of six faces of the liquid housing part 92.

Air holes other than the opening part 84 are not installed in the liquid pack 86, with the liquid pack 86 being collapsed at the time of discharge of the liquid.

Figure 9A:
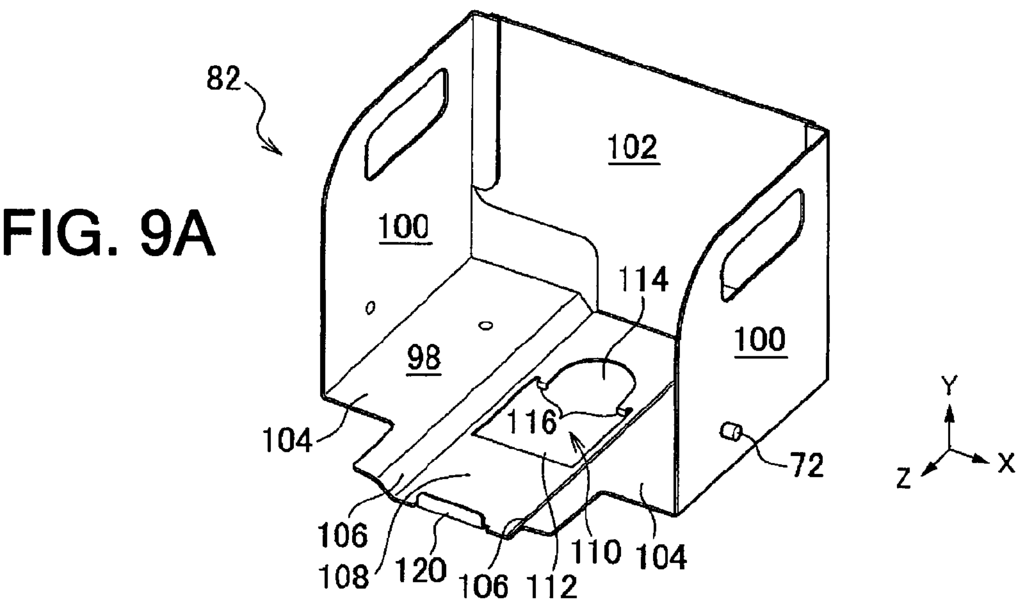
FIGS. 9A to 9C are oblique views showing a carton adapter 82.
Figure 9B:
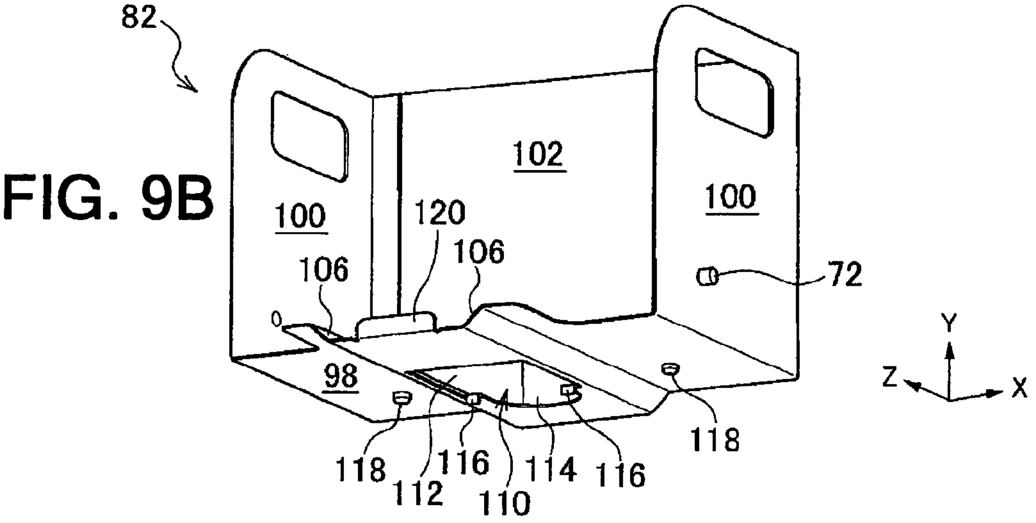
Figure 9C:
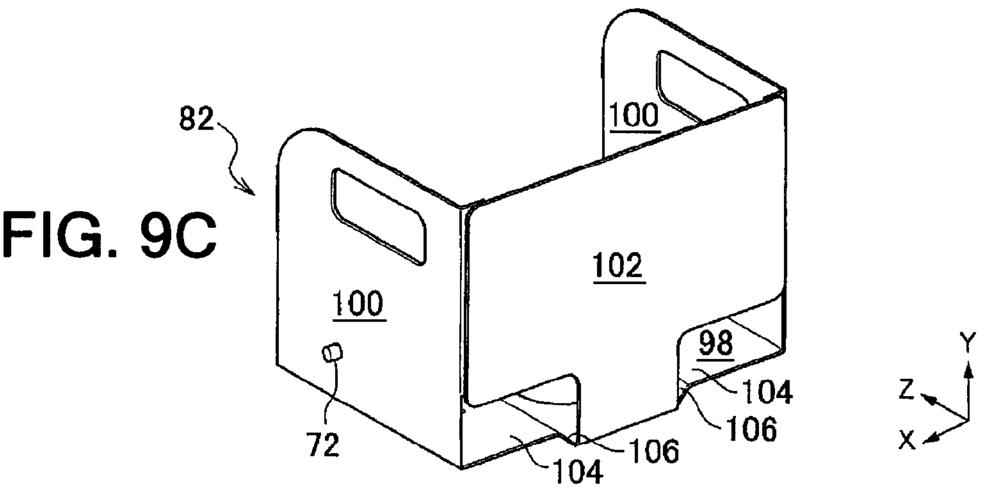

FIGS. 9A to 9C are oblique views showing a carton adapter 82. In FIGS. 9A to 9C, the carton adapter 82 observed from three directions while changing the angle is shown.

The carton adapter 82 is made of a thin sheet metal, with bottom plate 98, side plates 100, and front plate 102 being formed at a right angle to each other so that four faces of the front, both side faces, and the bottom face of six faces of the carton unit 80 are enclosed.

The bottom plate 98 is provided with a support face 104, which supports the bottom face of the carton unit 80 (that is, supports the bottom face of the liquid pack 86), and a step-difference face 108 installed so that a step is formed downward on the support face 104 via a tilt part 106. An aperture part 110 for passing the opening part 84 of the liquid pack 86 is formed in the step-difference face 108.

The aperture part 110 includes a part opened in a rectangular shape (hereinafter, referred to "rectangular aperture part") 112 and a part opened in a semicircular shape (hereinafter, referred to "semicircular aperture part") 114. The rectangular aperture part 112 is formed so that it is larger than the cross section of the collar part 96 of the opening part 84 of the liquid pack 86 and passes through the opening part 84. The semicircular aperture part 114 is formed so that it is smaller than the cross section of the collar part 96 and hooks the collar part 96 of the opening part 84 passed from the rectangular aperture part 112 to prevent the opening part 84 from being slipped from the opening part 110. In addition, two click parts 116 are formed between the rectangular aperture part 112 and the semicircular aperture part 114 so that the click parts are protruded in the passing direction of the opening part 84. Here, the semicircular opening part has been a semicircular shape, however it may be any shape that runs along the shape of the opening part 84 and is held to hook the collar part 96 of the opening part 84 so that slipping of the opening part 84 from the aperture part 110 is prevented. Shapes other than the semicircular shape may also be adopted.

Figure 10:
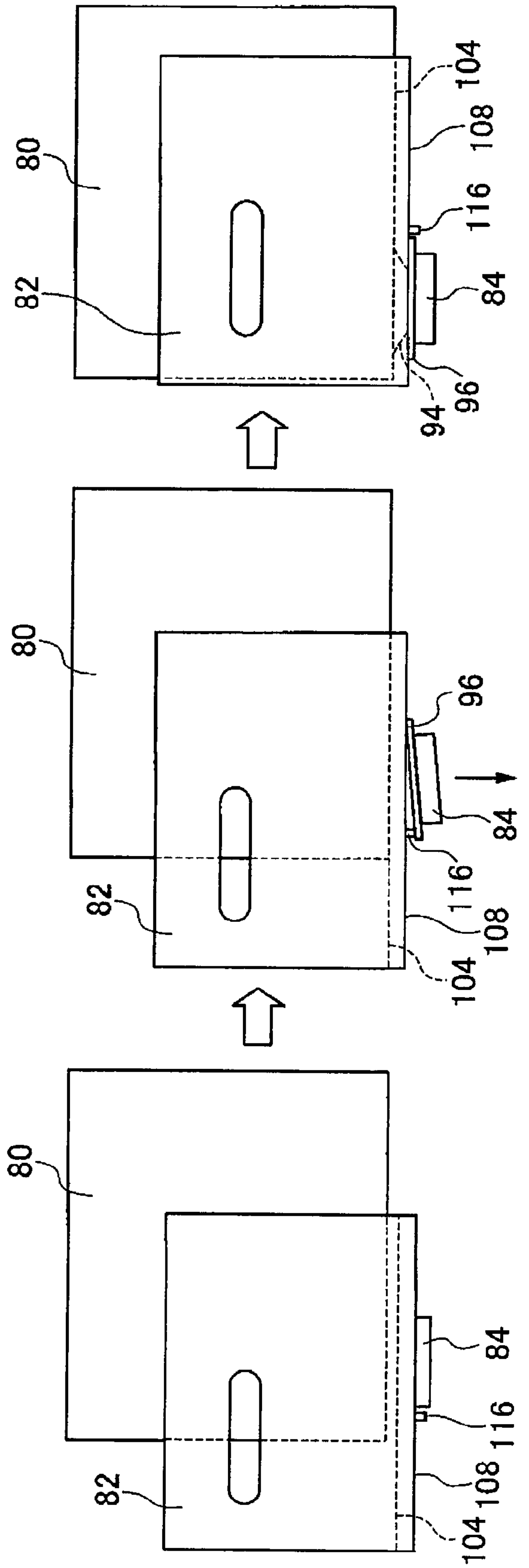
FIG. 10 is an illustrative diagram showing a state in which the carton unit 80 is loaded into the carton adapter 82.

FIG. 10 is an illustrative diagram showing a state in which the carton unit 80 is loaded into the carton adapter 82.

After the opening part 84 is passed from the rectangular aperture part 112, the opening part 84 is moved (slid) up to the semicircular aperture part 114 while pulling out said opening part downward so that the collar part 96 of the opening part 84 does not climb over the click parts 116. At the position where the collar part 96 of the opening part 84 climbs over the click parts 116, the opening part 84 is prevented from being pulled out downward, with the collar part 96 of the opening part 84 being pressed against two click parts 116, holding the opening part 84 by the semicircular aperture part 114 and two click parts 116.

Therefore, the carton adapter 82 holds the opening part 84 of the liquid pack 86 by the holding parts (semicircular aperture part 114 and click parts 116) of the step-difference face 108 installed downward in the gravity direction to the support face 104 while supporting the bottom face of the carton unit 80 (that is, the bottom face of the liquid pack 86) by the support face 104. With this constitution, since a portion exhibiting a funnel shape is formed at the periphery of the opening part 84 of the liquid pack 86, precisely, since the shape of the funnel-shaped part 94 installed at the periphery of the opening part 84 of the liquid pack 86 is maintained, the discharging of a liquid from the liquid pack can be improved. Here, "funnel shape" means a shape in which the liquid bag at the periphery of the opening part has a gradient toward the opening part, with the internal liquid being guided to the opening part, when the opening part is set downward in the gravity direction.

In the liquid pack 86 of this embodiment, the funnel-shaped part 94 has been installed in advance. However, even if the funnel-shaped part 94 is not aggressively installed in the liquid pack 86, since the holding parts (semicircular aperture part 114 and click parts 116) for holding the opening part 84 are installed downward in the gravity direction to the support face 104 for supporting the bottom face of the carton unit 80 (that is, the bottom face of the liquid pack 86) in the carton adapter 82, a portion exhibiting a funnel shape is formed at the periphery of the opening part 84 of the liquid pack 86, improving the ability to discharge a liquid from the liquid pack 86.

In addition, in this embodiment, the liquid pack 86 has been loaded into the carton adapter 82 after being housed in the carton 88. However, even if the liquid pack 86 is directly loaded into the carton adapter 82 without using the carton 88, since the holding parts (semicircular aperture part 114 and click parts 116) for holding the opening part 84 are installed downward in the gravity direction to the support face 104 for supporting the bottom face of the liquid pack 86 in the carton adapter 82, a portion exhibiting a funnel shape is formed at the periphery of the opening part 84 of the liquid pack 86, improving the discharge of a liquid from the liquid pack 86.

The reason why the liquid pack 86 is loaded into the carton adapter 82 after being housed in the carton 88 is that handling in the state in which the liquid pack 86 is housed in the carton 88 is easier than that in the state of having only the liquid pack 86, with the liquid pack 86 being easily loaded into the carton adapter 82. Another reason is that a step difference between the support face 104 and the holding parts is easily generated, the face for protruding only the funnel-shaped part from the aperture 90 of the carton 88 is easily formed, and a portion exhibiting a funnel shape with a better discharge property is formed, compared with the case in which the liquid pack 86 is not housed in the carton 88 but is mounted in the carton adapter 82 with only the liquid pack 86 being contained.

As shown in FIGS. 9A to 9C, one piece each of coupling pin 72 is formed outward in both side plates 100 of the carton adapter 82. In addition, two positioning pins 118 whose tips are slightly rounded outward are formed in the bottom plate 98 of the carton adapter 82. The coupling pins 72 will be mentioned later. The positioning pins 118 are used for the alignment when the tank unit 42 is mounted on the pedestal 44. Here, a protruded portion 120, which is formed at the end of the step-difference face 108 so that it protrudes in the direction opposite to the click parts 116, is arranged at the position opposite to the tank detection sensor 60 when the tank unit 42 is mounted on the pedestal. In other words, this portion is that which is to be detected by the tank detection sensor 60.

Figure 11A:
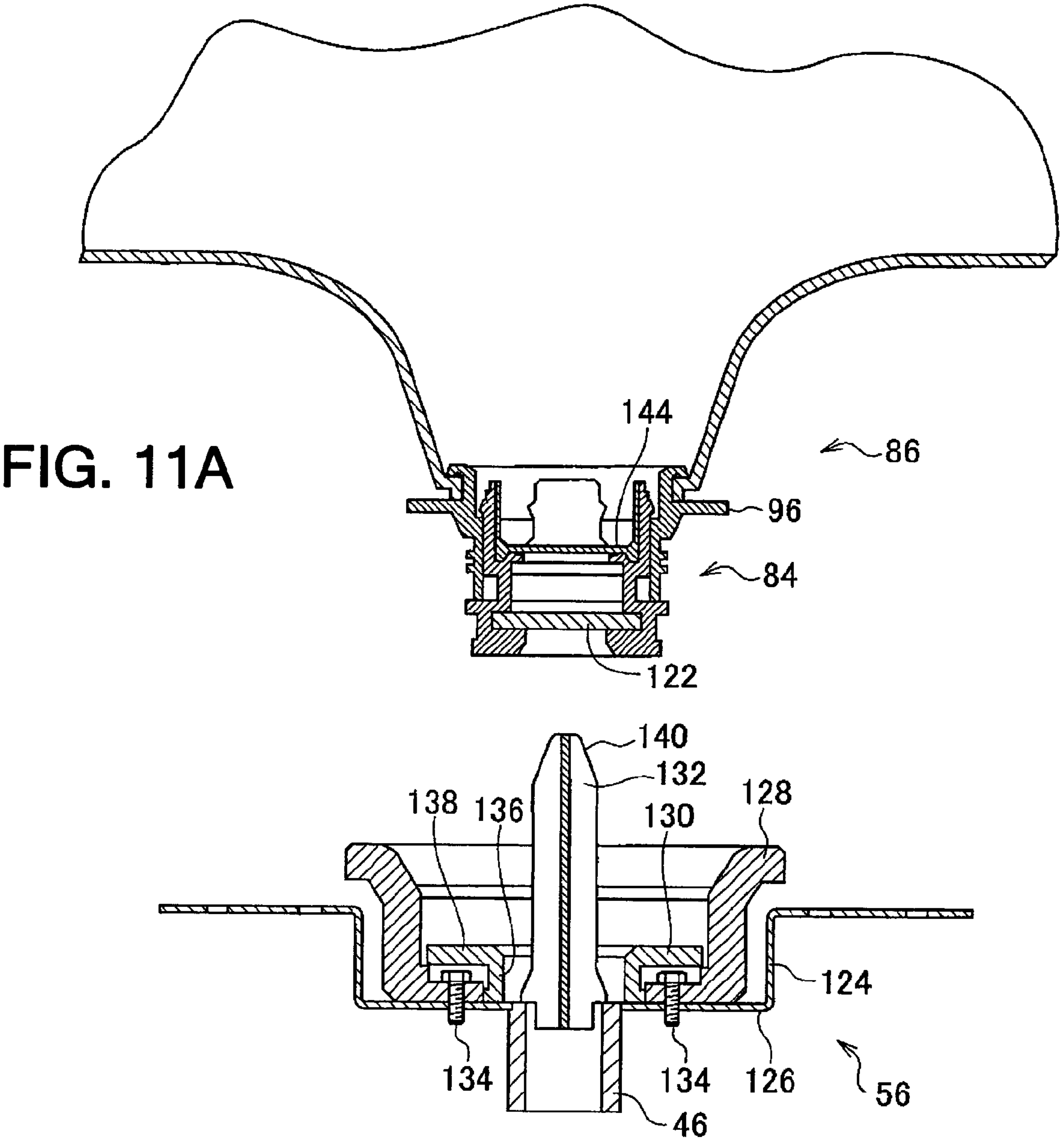
FIGS. 11A and 11B are cross sections showing details of the boring part 56 and an opening part 84 of the liquid pack 86.
Figure 11B:
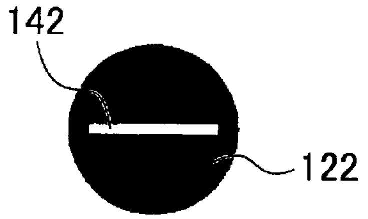
Figure 12A:
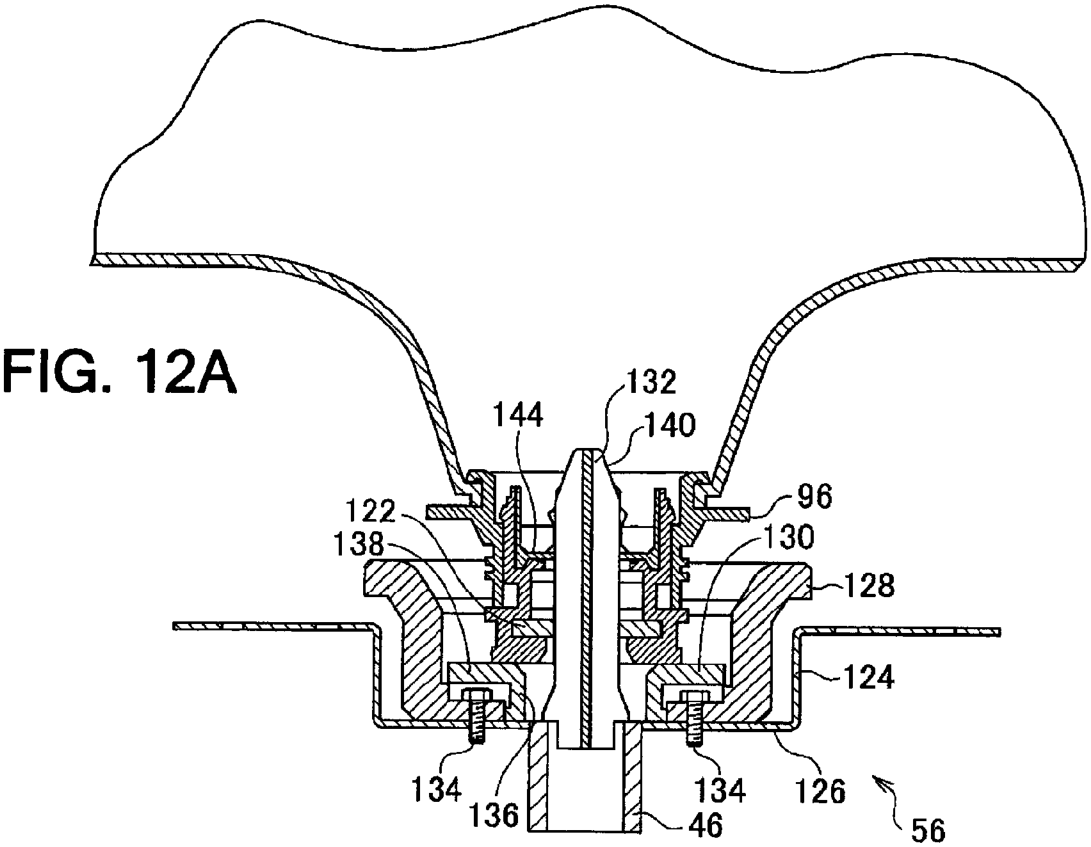
FIGS. 12A and 12B are cross sections showing details of the boring part 56 and the opening part 84 of the liquid pack 86 similarly to FIGS. 11A and 11B.
Figure 12B:
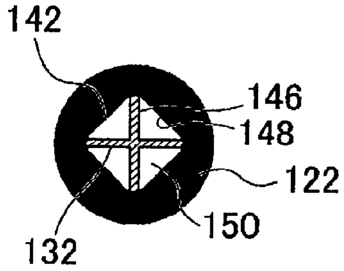

FIGS. 11 and 12 are cross sections showing details of the boring part 56 and the opening part 84 of the liquid pack 86. FIG. 11A is a cross section showing the state before the boring part 56 is at a lower position and is inserted into the opening part 84 of the liquid pack 86; FIG. 12A is a cross section showing a state in which the boring part 56 is at an upper position and is inserted into the opening part 84 of the liquid pack 86. FIG. 11B is an illustrative diagram showing the state of a seal part 122 that is installed in the opening part 84 of the liquid pack 86 in the state of FIG. 11A; FIG. 12B is an illustrative diagram showing the seal part 122 in the state of FIG. 12A.

The boring part 56 includes a base part 124, a cap part 128 that is installed in a concave part 126 of the base part 124 and that is opened upward, a receiving part 130 that is installed in the cap part 128, and a borer 132 that is arranged in the receiving part 130.

The cap part 128 is fixed to the base part 124 with a screw 134. A hole is installed in advance at the center of the bottom face of the cap part 128. In addition, a hole smaller than the hole of the cap part 128 by one turn is also installed in advance at the center of the bottom face of the concave part 126 of the base part 124.

The receiving part 130 is made of a rubber material, exhibits an approximately tubular shape, and is provided with a tube part 136 and a bracket part 138 extending outward from one end of the tube part 136. The other end of the tube part 136 is closely stuck to the bottom of the concave part 126 of the base part 124, with the bracket part 138 being closely stuck to the bottom of the cap part 128. One end of the pipe 46 for connecting with a supply destination of a liquid is connected to the hole formed in the concave part 126 of the base part 124. The base part of the borer 132 is mounted at the end surface of the pipe 46, with the borer 132 being fixed in a state in which its tip is pointed upward.

Figure 13A:
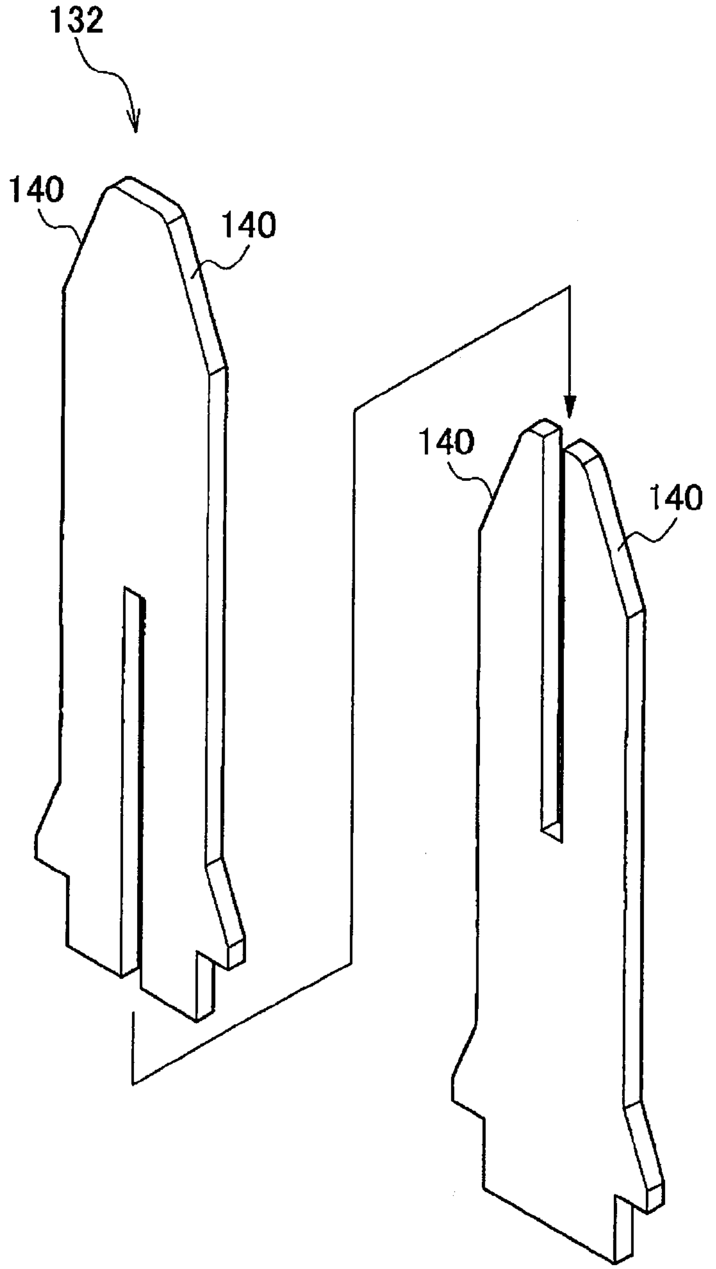
FIGS. 13A and 13B are detailed constitutional diagrams showing the constitution of a borer 132.
Figure 13B:
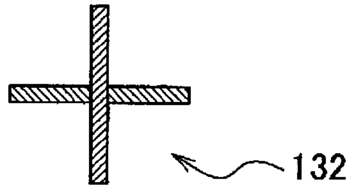

FIGS. 13A and 13B is a detailed constitutional diagram showing the constitution of the borer 132. FIG. 13A is a disassembled diagram of the borer 132; FIG. 13B is a cross section showing the borer 132.

The borer 132 is formed by combining two sheets of plates at a right angle to each other. Specifically, one plate among two sheets of plates has a groove extending from its base part and the other plate has a groove extending from its tip. These groves are mutually inserted into the other plates and combined to form the borer 132. After combining, each plate is fixed by welding or using an adhesive. As shown in FIG. 13A, a tilt part 140, which is tilted toward the tip center, is formed at the tip of the borer 132 and exhibits a radial shape, specifically a plus symbol shape in a cross-sectional view. In other words, the borer 132 exhibits a plus symbol needle shape as a whole.

As shown in FIGS. 11 and 12, the seal part 122 is mounted in the opening part 84 of the liquid pack 86. The seal part 122 is made of silicone rubber, has elasticity, and exhibits a disc shape. At the center of the circular surface of the seal part 122, a slit (cut) 142 with a minus symbol shape penetrating into the other side from one side is installed. For easy understanding, although the slit width has been largely enlarged and shown in the figure, the actual slit width is fine, and the inflow and outflow of a liquid to and from the slit 142 is prevented as long as the slit 142 is not opened by pushing.

At the inner side from the seal part 122 in the opening part 84 of the liquid pack 86, a sealing film 144 for sealing the liquid in the liquid pack 86 is mounted.

As shown in FIGS. 12A and 12B, if the borer 132 is operated upward and inserted into the opening part 84, the slit 142 of the seal part 122 is pressed and extended in a rectangular shape by the borer 132. Here, if the length of the slit 142 having a minus symbol shape before being pressed and extended is assumed as L, the total length of four sides of the slit 142 with a rectangular shape after being pressed and extended by the borer 132 is increased in a range of within 10% to a length in a range from 2 L to 2 L×110%.

If the sealing film 144 is broken through by the borer 132, the liquid in the liquid pack 86 starts to flow out downward. The liquid is guided up to the pipe 46 through a space 150, which is secured by an outer wall surface 146 of the borer 132 and an inner wall surface 148 of the slit, pressed and extended in a rectangular shape, and is supplied to the main ink tank 21 as a connection destination through the pipe 46. Compared with the case in which the borer 132 is constituted from a hollow needle, such as an injection syringe, with a liquid being discharged via the hollow part, a flow passage wall, which hinders the discharge of the liquid, is not formed in the flow passage (space 150) for discharging the liquid, and the liquid does not remain in the vicinity of the opening part. In other words, it can be said that the flow passage (space 150), which is secured by the outer wall surface 146 of the borer 132 and the inner wall surface 148 of the slit, allows complete discharge of the liquid.

Figure 14A:
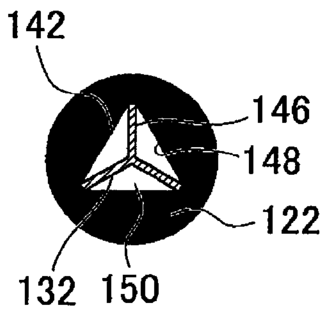
FIGS. 14A and 14B are illustrative diagrams showing another state of the borer 132.
Figure 14B:
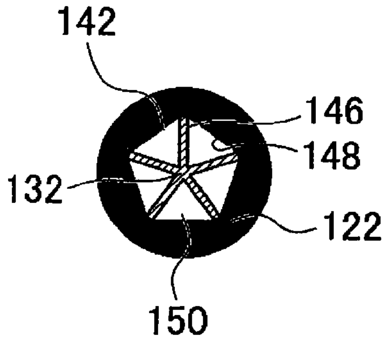

Here, as shown in FIGS. 14A and 14B, even if the borer 132 having the shape of the cross-sectional view other than the plus symbol shape, for example, "Y" letter shape as shown in FIG. 14A or a shape extending in five directions as shown in FIG. 14B, is inserted into the slit 142 having the minus symbol shape, the space 150 as a flow passage is formed between the outer peripheral surface 146 of the borer 132 and the inner wall surface 148 of the pressed and extended slit. In other words, the borer 132 may have a radial shape in the cross-sectional view, so it is not limited to the plus symbol shape. Nevertheless, the borer 132 with the plus symbol shape in the cross-sectional view is more appropriate because it is easily prepared as shown in FIGS. 13A and 13B.

Here, the end surface of the opening part 84 of the liquid pack 86 is closely stuck to the bracket part 138 of the boring part 56, so the liquid is not exuded to the cap part 128.

If the borer 132 is operated downward from the state of FIG. 12A and pulled off from the opening part 84, the slit 142 of the seal part 122 returns to the plus symbol shape as shown in FIG. 11B. For this reason, even if the liquid remains in the liquid pack 86, the remaining liquid does not leak.

Here, in case the slit 142 of the seal part 122, for example, is formed in a "Y" letter shape or plus symbol shape other than the minus symbol shape, when the borer 132 is pulled off, a mutual meshing state is formed at the intersection of the slit 142, leaking no remaining liquid from the gap. For this reason, the slit 142 of the seal part 122 has been formed in the minus symbol shape.

As mentioned above, since the tip of the borer 132 is provided with the tilt part 140 that is tilted toward the center, even if the alignment precision of the opening part 84 to the position of the borer 132 is relatively rough, the borer 132 is guided to the opening part 84 and inserted. Namely, since the container for housing the liquid is constituted from the liquid pack 86 having no fixed shape, even if the position of the opening part 84 of the liquid pack 86 is difficult to be regulated with good precision, the borer 132 is reliably inserted into the opening part 84 by installing the tilt part 140 at the tip of the borer 132. In other words, compared with a borer having no tilt part, which is a hollow part such as an injection syringe and is tilted toward the tip center, even if the alignment of the opening part 84 of the bag of the liquid pack 86 to the borer 132 is not applied with good precision, the borer 132 can be favorably inserted into the opening part 84 of the liquid pack 86.

FIGS. 15A to 15E are oblique views showing the exchange flow of the tank unit 42.

Figure 15A:
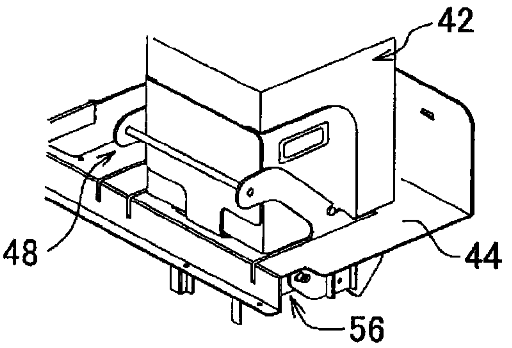
FIGS. 15A to 15E are oblique views showing an exchange flow of the tank unit 42.

In an initial state of FIG. 15A, the display lamp 54 shown in FIG. 2 is lit, and if an operator desires to exchange the tank unit 42, the operator presses the operation switch 52. If the operation switch 52 is pressed, the movable rod of the lock solenoid 58 retreats, releasing the lock of the operation lever 48.

Figure 15B:
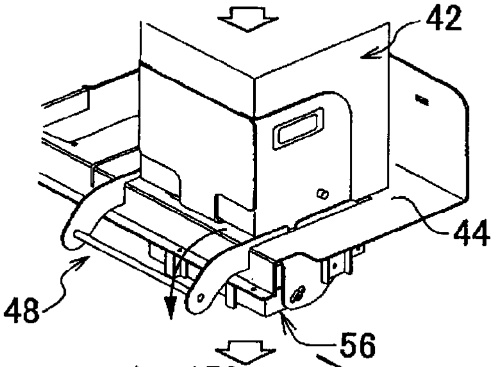

Next, as shown in FIG. 15B, if the operation lever 48 is operated downward, the bored part 56 is pulled off from the tank unit 42 by the interlocking of the operation lever 48 and the boring part 56.

Figure 15C:
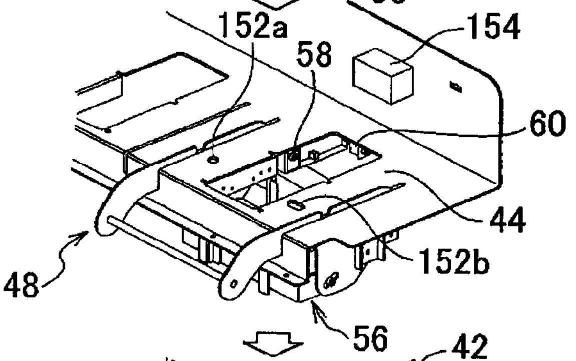

Next, as shown in FIG. 15C, if the tank unit 42 is removed from the pedestal 44, the output signal of the tank detection sensor 60 is changed. Using the change of the output signal as a trigger, the movable rod of the lock solenoid 58 jumps out. Therefore, the operation lever 48 is locked.

Figure 15D:
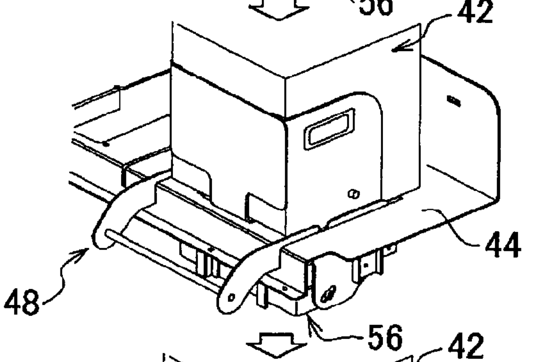

Next, as shown in FIG. 15D, a new (filled with ink) tank unit 42 is placed on the pedestal 44.

Figure 16:
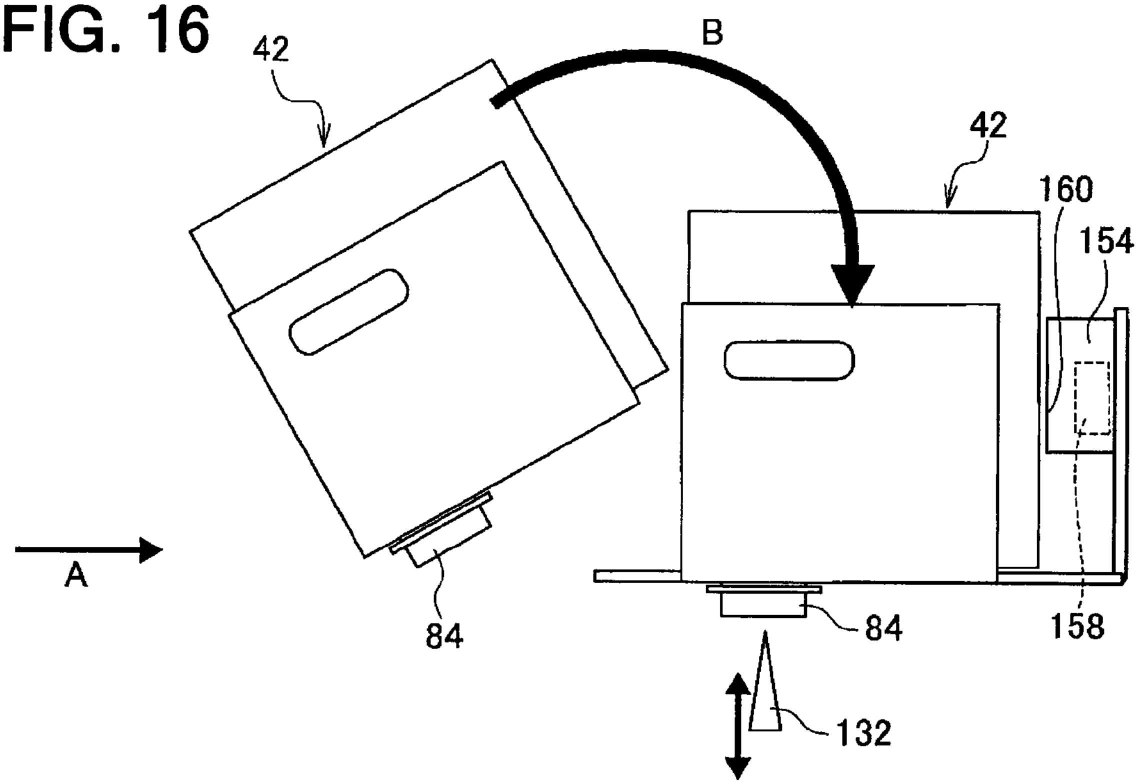
FIG. 16 is an illustrative diagram showing the state when the tank unit 42 is mounted on the pedestal 44.

FIG. 16 is an illustrative diagram showing the state when the tank unit 42 is mounted on the pedestal 44.

In the tank unit 42, the surface to which the opening part 84 of the liquid pack 86 is exposed is the bottom face, and the tank unit 42 is mounted on the pedestal 44 so that the opening part 84 of the liquid pack 86 is arranged downward. The tank unit 42 is mounted from the arrow A direction of FIG. 16 by an operator. In a state in which the tank unit 42 is slightly tilted so that opening part 84 is toward the inner side, the tank unit is made to close to the pedestal 44, and the tank unit 42 is mounted on the pedestal 44 while rotating as shown in the arrow B direction so that the opening part 84 faces downward from the aperture installed in the pedestal 44. At that time, the positioning pins 118 installed on the lower surface of the tank unit 42 are fitted to alignment holes (shown in FIG. 3 or FIG. 15C) 152*a* (round hole) and 152*b* (long hole) installed in the pedestal 44.

At the inner side of the pedestal 44, the stopper 154 is installed to regulate the movement to the inner side of the tank unit 42. As mentioned above, the borer 132 is arranged below the pedestal 44 and is freely moved in the vertical direction at a position opposite to the opening part.

As shown in FIG. 15D, if a new tank unit 42 is placed on the pedestal 44, the output signal of the tank detection sensor 60 is changed. Using the change of the output signal as a trigger, a bar code pasted on the tank unit 42 is read by the bar code reader 158. If an appropriate type of tank unit 42 is mounted, the movable rod of the lock solenoid 58 retreats, releasing the lock of the operation lever.

Figure 15E:
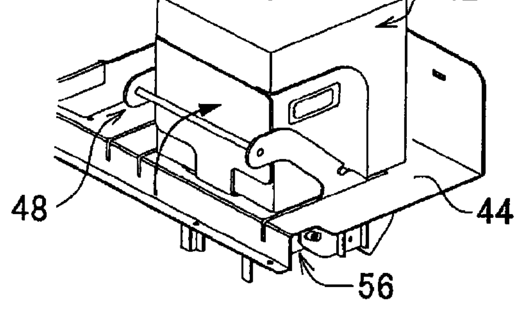

Next, as shown in FIG. 15E, if the operation lever 48 is operated upward, the boring part 56 is inserted into the tank unit by the interlocking of the operation lever 48 and the boring part 56. Therefore, the tank unit 42 is unsealed, discharging a liquid from the tank unit 42. The liquid discharged is supplied to the main ink tank 21 via the pipe 46. In the pipe 46, a valve, flow adjustment mechanism, etc., are not installed, so if the tank unit 42 is unsealed by the boring part 56, the entire liquid of the tank unit 42 is discharged. As mentioned above, since the tank unit 42 is constituted so that its discharge property is improved, 10 L of liquid, which is filled in the tank unit 42, is discharged in about 90 sec.

In addition, in FIG. 15E, if the operation lever 48 is operated upward, the movable rod of the lock solenoid 58 jumps out. Therefore, the operation lever 48 is locked. Here, a well-known proximity sensor 156 (shown in FIG. 4) may be used for the detection of the position of the operation lever 48.

Moreover, in FIG. 15A, if the operation lever 48 is not operated downward for 30 sec, although the operation switch 52 is pressed and the lock of the operation lever 48 is released, the operation lever is relocked by the lock solenoid 58. The reason for this is that the heat generation due to the lengthy electrification of the lock solenoid is prevented. In this case, to release the lock of the operation lever 48, it is necessary to press the operation switch 52 again.

Furthermore, in FIG. 15D, in case an appropriate tank unit 42 is not mounted, since the lock of the operation lever 48 is not released, the wrong type of tank unit 42 is not mounted on the pedestal 44.

Figure 17A:
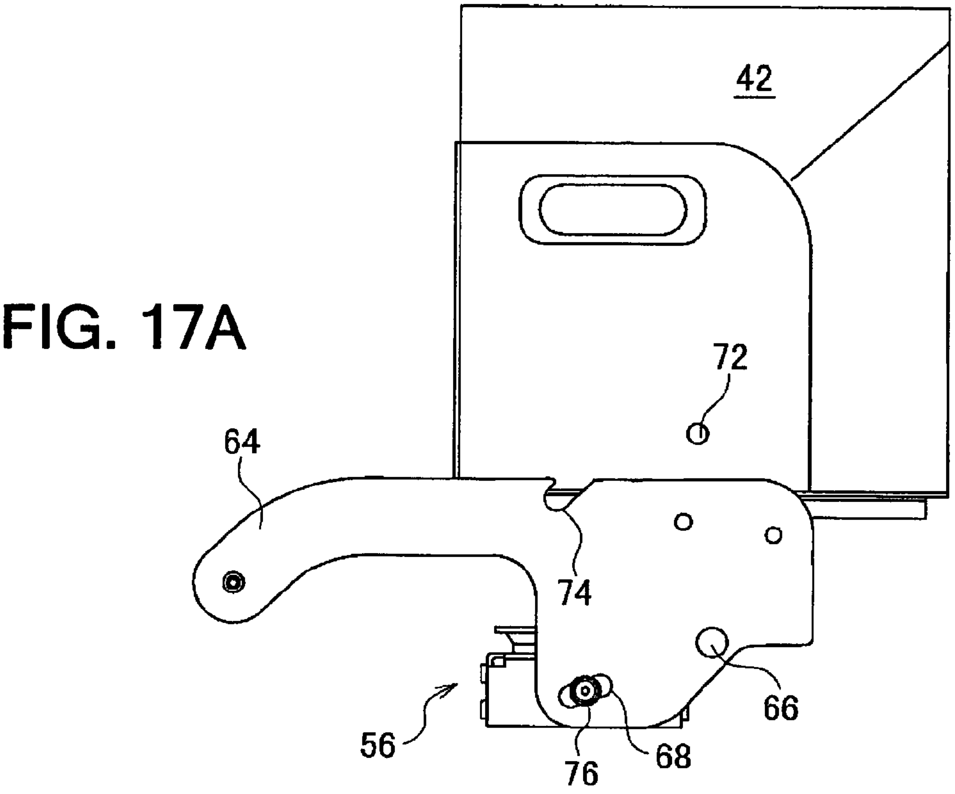
FIGS. 17A and 17B are side views showing the case wherein the exchange state of the tank unit 42 shown in FIGS. 15A to 15E is observed from the lever arm 64 side.
Figure 17B:
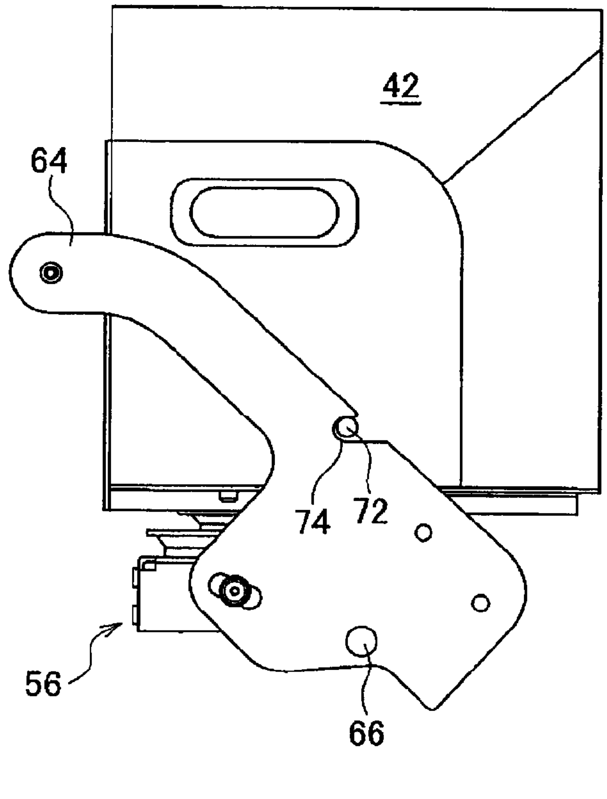

FIGS. 17A and 17B is a side view showing the case wherein an exchange state of the tank unit 42 shown in FIGS. 15A to 15E are observed from the lever arm 64 side. FIG. 17A is a side view corresponding to FIG. 15D; FIG. 17B is a side view corresponding to FIG. 15E.

As mentioned above, the coupling pins 72 are installed on the side surfaces of the tank unit 42 (precisely, carton adapter 82), and as shown in FIG. 15E or FIG. 17B, if the operation lever 48 is moved to the upper position, the coupling pins 72 are coupled with the notched grooves 74 of the lever arms 64. The notched grooves 74 are formed along the circumference centering around the rotational shaft 66, such that removal of the tank unit 42 in a coupled state is prohibited.

In other words, if the operation lever 48 is at the upper position, since the motion of the operation lever 48 is fixed by the lock solenoid 58, an operator can mechanically release the coupled state, and the tank unit 42 cannot be removed.

Specifically, if the operation lever 48 is at the upper position and the boring part 56 is at the position where it is inserted into (put into) the tank unit 42, the notched grooves 74 of the lever arms 64 are coupled with the coupling pins 72 of the tank unit 42, preventing the slipping of the boring part 56 from the tank unit 42.

More specifically, the operation lever 48 for operating the boring part 56 is constituted so that the coupling pins 72 installed in the tank unit 42 are coupled with the operation lever 48 that is locked except for the case in which the tank unit 42 is attached and detached to and from the pedestal. Therefore, in a state in which the boring part 56 is inserted into the tank unit 42, the slipping of the tank unit 42 from the boring part 56 due to an unexpected movement can be prevented. Thereby, the drying out of the liquid attached to the boring part 56 is prevented.

Figure 18A:
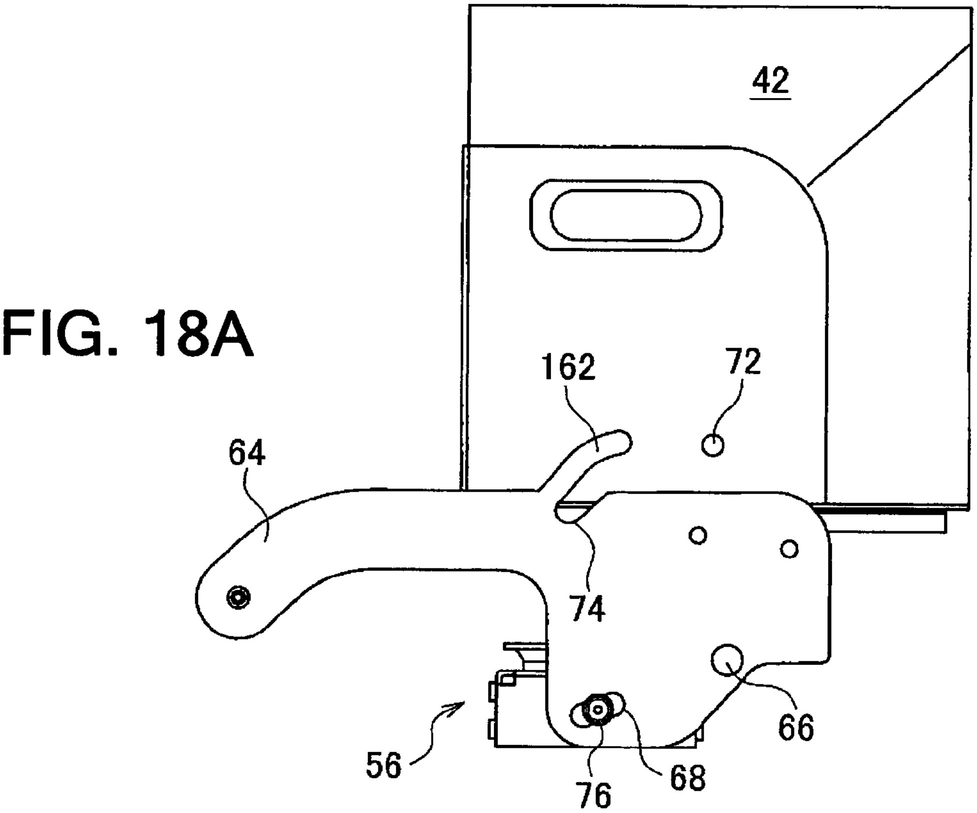
FIGS. 18A and 18B are side views showing another state of the lever arm 64 similarly to FIGS. 17A and 17B.
Figure 18B:
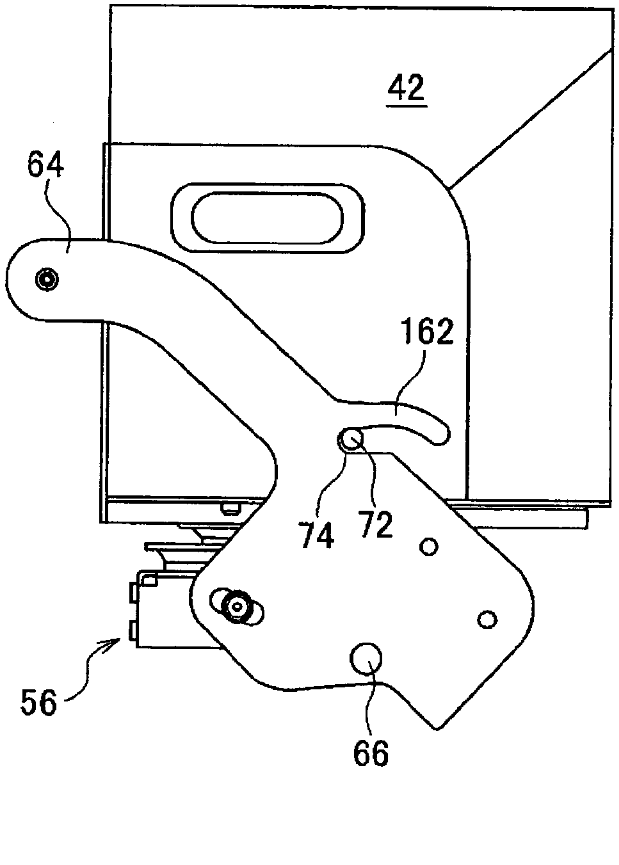

Here, as shown in FIGS. 18A and 18B, protruded parts 162 may be installed in the lever arms 64 so that the notched grooves 74 are extended. Also, coupling of the coupling pins 72 and the lever arms 64 may be started before the boring part 56 is inserted into the tank unit 42, preventing the tank unit 42 from removing the pedestal 44 from the previous stage in which the boring part 56 is inserted into the tank unit 42. In addition, when the boring part is inserted into the opening part, since the generated reaction force is stopped by these protruded parts 162, the tank unit 42 does not float from the pedestal 44.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

DESCRIPTION OF REFERENCE NUMERALS

1: Medium conveying device
11: First guide member
12: Conveying passage
13: Conveying member
14: Closed hold member
21: Second guide member
29: Held member
37: One end part support member
37 to 52+Y: Open hold device
38: One end rotation part
39: One end support part
46: Move guide part
47: Moving body
48: Rotation shaft
49: Opposite end support member
52: Urging member
S: Medium
U: Image forming apparatus
U1*a*: Image record section.
Y: Open hold member, string-like member

What is claimed is:

1. A liquid supply device comprising:

a container that includes a sealing film and is filled with a liquid;

a pedestal on which the container is set;

a detector that detects whether the container is set on the pedestal or not;

a boring part that bores the sealing film of the container when the boring part is inserted into the container to discharge the liquid from the container and supply the liquid to a supply destination;

an operation lever that is connected to the boring part and operates the boring part so that the boring part is pulled out and inserted into the container;

a fixing member that locks the operation lever when the boring part is inserted into the container; and a coupling portion that is installed in the container and is coupled with the operation lever when the operation lever is moved to the position where the boring part is inserted into the container to prevent the boring part from slipping from the container;

wherein the boring part is pulled out and inserted into the container set on the pedestal, the fixing member locks the operation lever in a state where the boring part is inserted into the container, and the fixing member locks the operation lever when the detector detects that the container is not set on the pedestal in a state where the boring part is pulled out of the container.

2. The liquid supply device according to claim 1, wherein the operation lever is rotatable around a rotational shaft and is provided with a notched groove formed along a circumference direction of the rotational shaft, and the coupling portion is coupled with the notched groove in response to a movement of the operation lever around the rotational shaft.

3. The liquid supply device according to claim 1 further comprising:

a display unit that shows an amount of the liquid remaining in the container, wherein the fixing member releases the operation lever in response to an operation by a user after the display unit shows that the amount of the liquid remaining in the container decreases to a predetermined level.

4. The liquid supply device according to claim 1, wherein the container is provided with data which is unique to the container, the liquid supply device further comprises a reading unit that reads the data from the container set on the pedestal, and when the data read by the reading unit matches stored data, the fixing member releases the operation lever from being locked and the boring part is in a state of being pulled out of the container.

5. The liquid supply device according to claim 1, wherein the coupling portion is directly coupled with the operation lever.

* * * * *